United States Patent
Kubara et al.

(10) Patent No.: US 10,359,564 B2
(45) Date of Patent: Jul. 23, 2019

(54) METHOD OF MANUFACTURING MULTI-MODE OPTICAL FIBER

(71) Applicant: SUMITOMO ELECTRIC INDUSTRIES, LTD., Osaka-shi, Osaka (JP)

(72) Inventors: Saori Kubara, Yokohama (JP); Tomohiro Ishihara, Yokohama (JP); Kazuhiro Yonezawa, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/252,901

(22) Filed: Aug. 31, 2016

(65) Prior Publication Data
US 2017/0057864 A1 Mar. 2, 2017

(30) Foreign Application Priority Data
Sep. 1, 2015 (JP) ................................. 2015-171896

(51) Int. Cl.
*C03B 37/014* (2006.01)
*C03B 37/018* (2006.01)
*G02B 6/028* (2006.01)

(52) U.S. Cl.
CPC ...... *G02B 6/0288* (2013.01); *C03B 37/01413* (2013.01); *C03B 37/01815* (2013.01); *C03B 2203/26* (2013.01); *C03B 2207/70* (2013.01)

(58) Field of Classification Search
None
See application file for complete search history.

(56) References Cited

U.S. PATENT DOCUMENTS

| | | | | |
|---|---|---|---|---|
| 2010/0154479 | A1* | 6/2010 | Milicevic | C03B 37/01807 65/391 |
| 2013/0148934 | A1* | 6/2013 | Nakanishi | C03B 37/02718 385/124 |
| 2014/0020431 | A1* | 1/2014 | Genz | C03B 37/01815 65/378 |

(Continued)

FOREIGN PATENT DOCUMENTS

| | | |
|---|---|---|
| JP | 2003-315184 A | 11/2003 |
| JP | 2006-096608 | 4/2006 |

(Continued)

*Primary Examiner* — Lisa L Herring
(74) *Attorney, Agent, or Firm* — Drinker Biddle & Reath LLP (57) ABSTRACT

A method of manufacturing multi-mode optical fiber is disclosed. The method of manufacturing includes: a step of forming a first glass base material while controlling a supply rate of an additive for adjusting a refractive index to achieve a desired refractive index distribution; a step of drawing the first glass base material; a step of measuring a residual stress distribution in a radial direction of the multi-mode optical fiber after being drawn; a step of readjusting the supply rate of the additive in accordance with deviation of a refractive index, acquired from the residual stress distribution measured, from the desired refractive index distribution; a step of forming a second glass base material while supplying the additive at the supply rate after being readjusted; and a step of drawing the second glass base material.

4 Claims, 8 Drawing Sheets

(56) References Cited

U.S. PATENT DOCUMENTS

| | | | | |
|---|---|---|---|---|
| 2014/0254997 A1* | 9/2014 | Tamura | ............ | C03B 37/01807 |
| | | | | 385/126 |
| 2014/0328565 A1* | 11/2014 | Sakabe | ................ | G02B 6/0288 |
| | | | | 385/124 |
| 2015/0331180 A1* | 11/2015 | Oyamada | ............ | G02B 6/0283 |
| | | | | 385/124 |

FOREIGN PATENT DOCUMENTS

| JP | 2006-290710 A | 10/2006 |
|---|---|---|
| JP | 2013-235264 | 11/2013 |
| JP | 2014-534944 A | 12/2014 |
| WO | WO-2013/074078 A1 | 5/2013 |

* cited by examiner

METHOD OF MANUFACTURING MULTI-MODE OPTICAL FIBER

CROSS REFERENCE TO RELATED APPLICATIONS

This application is based upon and claims the benefit of priority from Japanese Patent Application No. 2015-171896, filed on Sep. 1, 2015; the entire contents of which are incorporated herein by reference.

TECHNICAL FIELD

The present invention relates to a method of manufacturing multi-mode optical fiber.

BACKGROUND

Japanese Unexamined Patent Publication No. JP2006-290710A discloses a method of manufacturing optical fiber preform and optical fiber. The method disclosed in JP2006-290710A preliminarily acquires change of a refractive index profile in a manufacturing process of optical fiber, and then adjusts at least one of manufacturing conditions of optical fiber preform and optical fiber on the basis of the change.

Japanese Unexamined Patent Publication No. JP2014-534944A discloses a method of manufacturing optical fiber. In the method disclosed in JP2014-534944A, first, preform is provided inside a furnace, and a plurality of optical fibers are drawn from the preform at a plurality of different levels of drawing tension. Then, bandwidth characteristics of the plurality of optical fibers are measured, and a setting value of drawing tension of an optical fiber is selected so that the optical fiber at the setting value has bandwidth characteristics close to desired bandwidth characteristics.

SUMMARY

A method of manufacturing multi-mode optical fiber, in accordance with an embodiment of the present invention, comprises: a step a) of forming a first glass base material with a cylindrical shape while controlling a supply rate of an additive for adjusting a refractive index to achieve a desired refractive index distribution in a radial direction of multi-mode optical fiber; a step b) forming a first multi-mode optical fiber by drawing the first glass base material formed in the step a); a step c) measuring a residual stress distribution in the radial direction of the first multi-mode optical fiber after being drawn; a step d) readjusting the supply rate of the additive in accordance with deviation of a refractive index, acquired from the residual stress distribution measured, from the desired refractive index distribution; a step e) forming a second glass base material with a cylindrical shape while supplying the additive at the supply rate after being readjusted; and a step f) forming second multi-mode optical fiber by drawing the second glass base material formed in the step e).

DETAILED DESCRIPTION

Optical fiber is generally formed by drawing a cylindrical glass base material along its center axial direction. Multi-mode optical fiber includes various refractive index distributions such as a graded index type. To achieve such a refractive index distribution, a glass base material is formed while a supply rate of an additive for adjusting a refractive index is changed in a radial direction when the multi-mode optical fiber is manufactured.

The multi-mode optical fiber, however, may cause residual stress when the multi-mode optical fiber is drawn from the glass base material. This residual stress affects a refractive index distribution of the multi-mode optical fiber. Thus, even if the refractive index distribution of the glass base material is accurately formed to apply a desired refractive index distribution to the multi-mode optical fiber, a refractive index distribution of the multi-mode optical fiber after being drawn may deviate from the desired refractive index distribution. This may cause a problem in which bandwidth characteristics of the multi-mode optical fiber varies.

The method of manufacturing multi-mode optical fiber of the present disclosure enables deviation of a refractive index distribution caused by residual stress after drawing to be reduced.

First, contents of the embodiments of the present invention listed below will be described. A method of manufacturing multi-mode optical fiber, in accordance with an embodiment of the present invention, comprises: a step of forming a first glass base material with a cylindrical shape while controlling a supply rate of an additive for adjusting a refractive index to achieve a desired refractive index distribution in a radial direction of the multi-mode optical fiber; a step of forming a first multi-mode optical fiber by drawing the first glass base material; a step of measuring a residual stress distribution in the radial direction of the first multi-mode optical fiber after being drawn; a step of readjusting the supply rate of the additive in accordance with deviation of a refractive index, acquired from the residual stress distribution measured, from the desired refractive index distribution; a step of forming a second glass base material with a cylindrical shape while supplying the additive at the supply rate after being readjusted; and a step of forming second multi-mode optical fiber by drawing the second glass base material.

According to the present inventors' knowledge, a level of residual stress in multi-mode optical fiber after drawing is in close association with a level of deviation of a refractive index. Thus, deviation of the refractive index distribution caused by residual stress can be reduced by measuring a residual stress distribution to readjust a supply rate of an additive for adjusting a refractive index in accordance with s measurement result thereof.

In a step of readjusting a supply rate of an additive in the method of manufacturing described above, the supply rate may be readjusted so that the supply rate of the additive becomes zero or more at an outermost edge of an additive supply range in the second glass base material. If a supply rate of an additive is set so that deviation of a refractive index converted from measured residual stress is canceled, the supply rate of the additive may have a negative value depending on a residual stress value. The refractive index decreases with distance from a center axis in the vicinity of a core of multi-mode optical fiber, and thus this kind of phenomenon tends to easily occur particularly in the vicinity of an outermost edge of an additive supply range (typically, a region corresponding to a core). Thus, the supply rate of the additive can be prevented from having a negative value to effectively reduce deviation of a refractive index distribution, caused by residual stress, by readjusting the supply rate so that the supply rate of the additive at the outermost edge of the additive supply range becomes zero or more.

In a step of readjusting a supply rate of an additive in the method of manufacturing described above, in a case where a radius of a region of the first glass base material corresponding to a core of the first multi-mode optical fiber is indicated as "r1", a radius r2 of a region where the supply rate of the additive is to be readjusted may be less than the radius r1. According to the present inventors' knowledge, a level of residual stress in the vicinity of an outermost edge of a core of multi-mode optical fiber greatly varies for each manufacturing lot, and thus residual stress is not constant. Thus, deviation of a refractive index distribution, caused by residual stress can be more accurately reduced by readjusting the supply rate only in a region corresponding to a core of the glass base material except a region corresponding to such a region where residual stress is inconstant. In this case, the supply rate may be readjusted so that the supply rate of the additive becomes zero or more at an outermost edge of the region to be readjusted. This enables the supply rate of the additive to be prevented from having a negative value, as with the method described above, and thus deviation of a refractive index distribution, caused by residual stress, can be effectively reduced. In this case, the radius r2 may be 0.95 times the radius r1 or less.

In a step of forming the first glass base material and a step of forming the second glass base material in the method of manufacturing described above, at least regions of the first and second glass base material corresponding to cores of first and second multi-mode optical fiber may be formed by using any one of an outside vapor deposition (OVD) method, a modified chemical vapor deposition (MCVD) method, and a plasma-activated chemical vapor deposition (PCVD) method. As described above, in a case where the glass base material is formed by using a method of radially accumulating glass, particularly the methods of manufacturing described above can be suitably performed.

Next, specific examples of a method of manufacturing multi-mode optical fiber in accordance with embodiment of the present invention will be described below with reference to drawings. The present invention is not limited to the examples, and is intended to include all modifications that are shown in scope of claims and in meaning and scope equivalent to those of claims. In description below, the same element is designated by the same reference numeral in description of the drawings, to omit duplicated description on the element.

Figure 1:
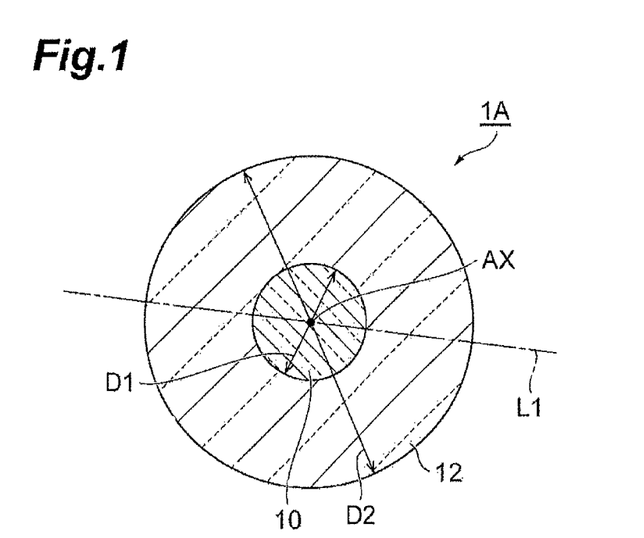
FIG. 1 illustrates an example of internal structure in a section perpendicular to a center axis of multi-mode optical fiber in accordance with an embodiment of the present invention.

FIG. 1 illustrates an example of internal structure in a section perpendicular to a center axis AX of a multi-mode optical fiber 1A in accordance with the present embodiment. As illustrated in FIG. 1, the multi-mode optical fiber 1A includes a core 10 made of mainly silica glass, and a cladding 12 that is provided on an outer peripheral surface of the core 10, and is mainly made of silica glass. The core 10 extends along the center axis AX, and has a circular cross-sectional shape. The core 10 has an outer diameter D1 that is not less than 47.5 µm and not more than 52.5 µm, for example. An outer peripheral surface of the cladding 12 and an outer peripheral surface of the core 10 are concentric with each other with respect to the center axis AX. The cladding 12 has an outer diameter D2 that is not less than 123 µm and not more than 127 µm, for example.

Figure 2:
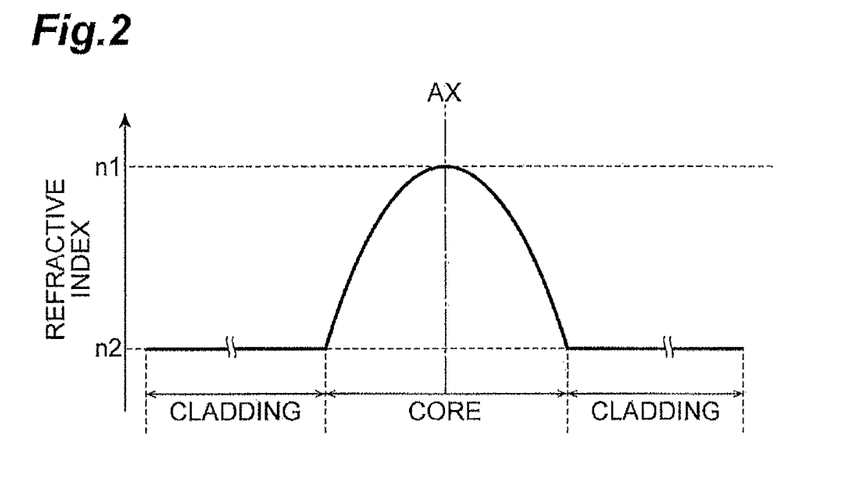
FIG. 2 illustrates a refractive index distribution of the multi-mode optical fiber.

FIG. 2 illustrates a refractive index distribution of the multi-mode optical fiber 1A. As illustrated in FIG. 2, a refractive index of the core 10 is more than a refractive index of the cladding 12 so as to confine light propagating through the multi-mode optical fiber 1A within the core 10. This refractive index distribution shows a refractive index at each portion on a straight line L1 orthogonal to the center axis AX illustrated in FIG. 1, and corresponds to a refractive index distribution of the multi-mode optical fiber 1A along a radial direction. A region from the center of the core 10, or the center axis AX, to a distance D1/2 corresponds to the core 10, and a region from the distance D1/2 to a distance D2/2 corresponds to the cladding 12. As illustrated in FIG. 2, the core 10 has a maximum refractive index n1 at the center, or the center axis AX. The refractive index of the core 10 gradually decreases from the center thereof toward an outer peripheral edge thereof, and coincides with a refractive index n2 of the cladding 12 at an outermost edge thereof. Thus, the refractive index n2 of the cladding 12 is less than the maximum refractive index n1 of the core 10.

The refractive index distribution described above is achieved by adding an additive for adjusting a refractive index to silica glass in the core 10 and the cladding 12. That is, refractive indexes of the core 10 and the cladding 12 vary in accordance with concentration of the additive with respect to the silica glass. Variations of the refractive index of the core 10 in the radial direction illustrated in FIG. 2 are achieved by radially varying the concentration of the additive. Various materials such as a material containing germanium (Ge), e.g. germanium tetrachloride ($GeCl_4$), capable of varying a refractive index, can be used as the additive for adjusting a refractive index.

Figure 3:
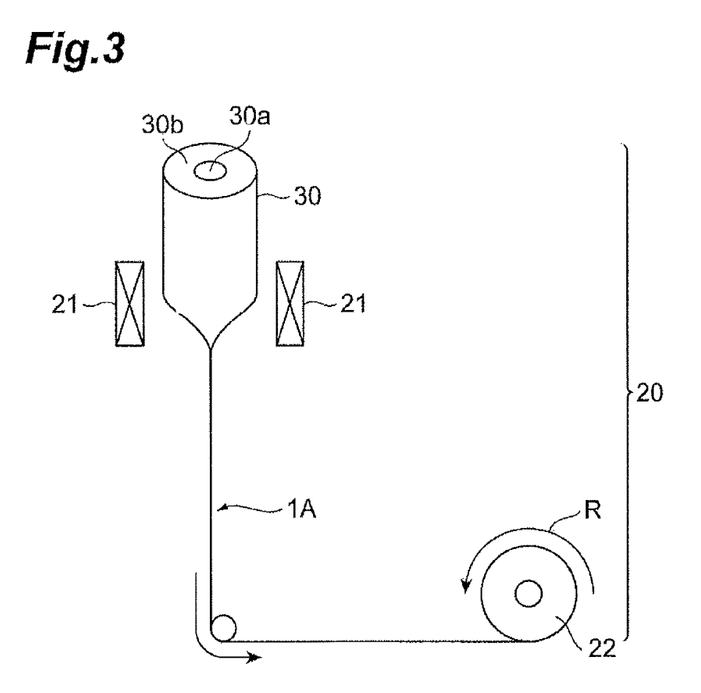
FIG. 3 schematically illustrates structure of a drawing apparatus used for manufacturing the multi-mode optical fiber.

Subsequently, the method of manufacturing the multi-mode optical fiber 1A will be described. FIG. 3 schematically illustrates structure of a drawing apparatus 20 used for manufacturing the multi-mode optical fiber 1A. The drawing apparatus 20 forms the multi-mode optical fiber 1A by drawing one end of a glass base material 30 with a cylindrical shape. The glass base material 30 includes a region 30a corresponding to the core 10, and a region 30b corresponding to the cladding 12. The drawing apparatus 20 includes a heater 21 that heats one end of the glass base material 30 that is set, and a winding drum 22 that winds the heated one end of the glass base material 30 while applying a predetermined tension to the end. The winding drum 22 adjusts its rotary speed when rotating in a direction indicated by an arrow R to adjust an outer diameter of each of the core 10 and the cladding 12. In addition, heating temperature by the heater 21 is adjusted to adjust tension (drawing tension) to be applied to the heated one end of the glass base material 30.

Figure 4:
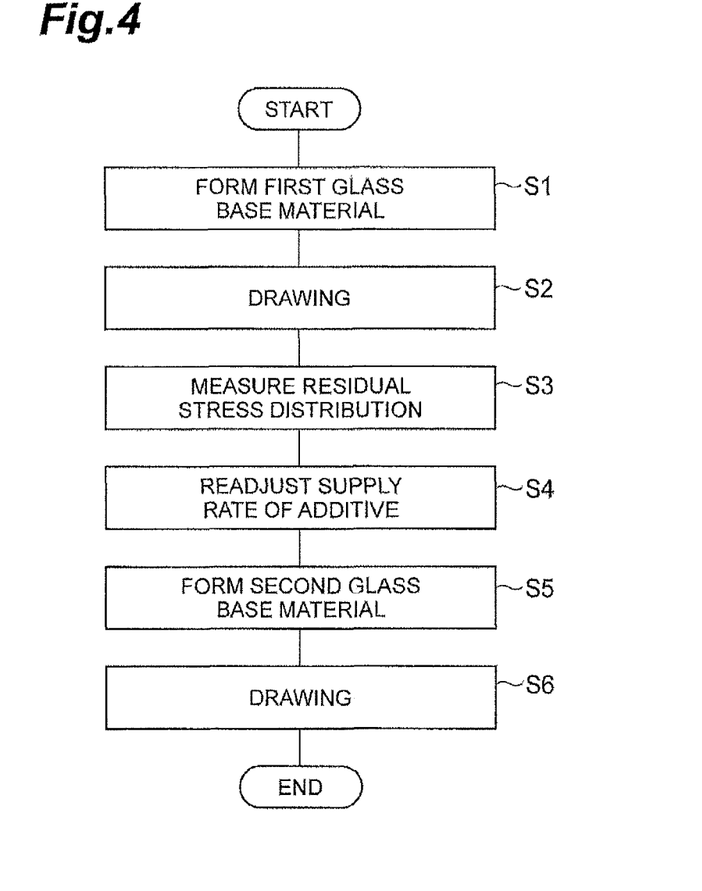
FIG. 4 is a flow chart illustrating each step of a method of manufacturing the multi-mode optical fiber of the present embodiment.

FIG. 4 is a flow chart illustrating each step of the method of manufacturing the multi-mode optical fiber 1A of the present embodiment. In the method of manufacturing, first, a first glass base material 30 with a cylindrical shape (refer to FIG. 3) is formed (step S1). In step S1, at least the region 30a corresponding to the core 10 in the glass base material 30 is formed by using any one of the OVD method, the MCVD method, and the PCVD method, for example. That is, the region 30a of the glass base material 30 is formed by radially accumulating silica glass. At this time, the silica glass is accumulated (soot deposition) while the additive for adjusting a refractive index is supplied. Then, the supply rate of the additive is controlled in accordance with a position of the glass base material 30 in a radial direction acquired from a time from a start of accumulation and an accumulation rate so that the desired refractive index distribution in the radial direction of the multi-mode optical fiber 1A (refer to FIG. 2) is achieved.

Next, the glass base material 30 formed in step S1 described above is drawn by using the drawing apparatus 20 illustrated in FIG. 3 (step S2). Then, the first multi-mode optical fiber 1A is formed.

Figure 5:
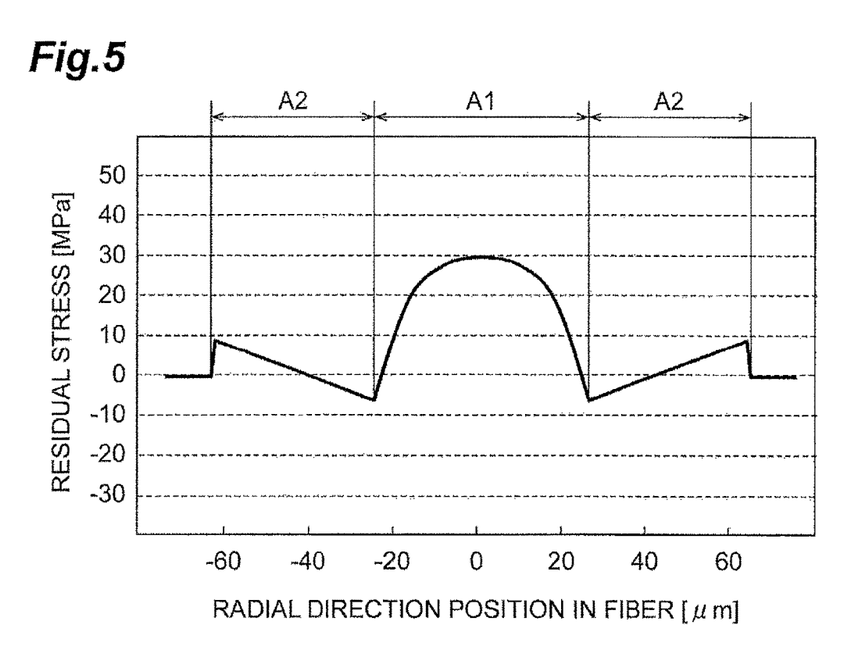
FIG. 5 is a graph illustrating an example of a residual stress distribution measured.

Subsequently, a residual stress distribution, in radial direction, of the multi-mode optical fiber 1A after being drawn formed in step S2 described above is measured (step S3). Primary residual stress is caused by silica glass composition of the multi-mode optical fiber 1A, and is generated when the silica glass is extended in step S2 described above. FIG. 5 is a graph illustrating an example of a residual stress distribution measured. In FIG. 5, the ordinate designates residual stress (unit: MPa), and the abscissa designates a radial direction position (unit: μm) with respect to the center axis, as an original point. The residual stress on a positive side corresponds to tensile stress, and the residual stress on a negative side corresponds to compression stress. A range A1 in FIG. 5 shows a range of the core 10 of the multi-mode optical fiber 1A, and a range A2 shows a range of the cladding 12. As illustrated in FIG. 5, the range A1 and the range A2 are different in a distribution shape of residual stress from each other. For example, the residual stress decreases from the center axis toward a peripheral portion in the range A1, and the residual stress increases from a boundary between the ranges A1 and A2 toward a peripheral portion in the ranges A2. The residual stress distribution described above is one example, and the method of manufacturing of the present embodiment is available for various residual stress distribution shapes. Preferably, measurement of a residual stress distribution may be performed multiple times in step S2 so that a total of a measurement result each time is averaged.

Figure 6:
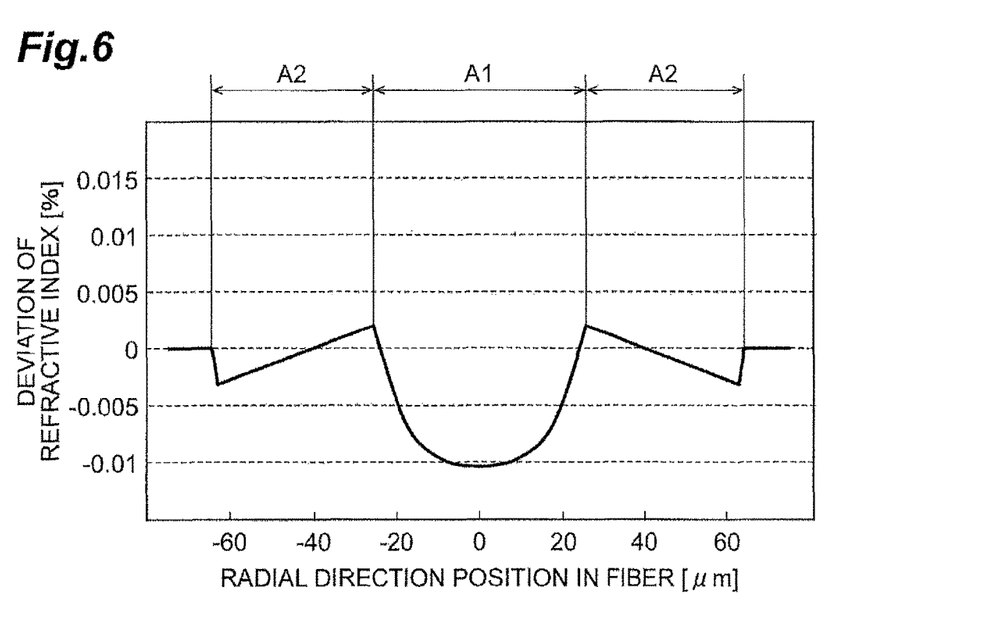
FIG. 6 is a graph illustrating an example of a distribution of deviation of a refractive index caused by residual stress.

Subsequently, the supply rate of the additive is readjusted in accordance with deviation of the refractive index from the desired refractive index distribution (refer to FIG. 2) acquired from the residual stress distribution measured step S3 described above (step S4). FIG. 6 is a graph illustrating an example of a distribution of deviation Δn of a refractive index caused by residual stress, and corresponds to the residual stress distribution illustrated in FIG. 5. In FIG. 6, the ordinate designates deviation Δn (unit: %) of a refractive index from the desired refractive index distribution, and the abscissa designates a radial direction position (unit: μm) with respect to the center axis, as an original point. For conversion from the residual stress distribution to the refractive index distribution, there is available a coefficient of "$-4.2 \times 10^{-12}$ $Pa^{-1}$" described in pages 140 to 142 of the document, "Denshi Tokyo, vol. 28" issued by IEEE, for example.

Figure 7:
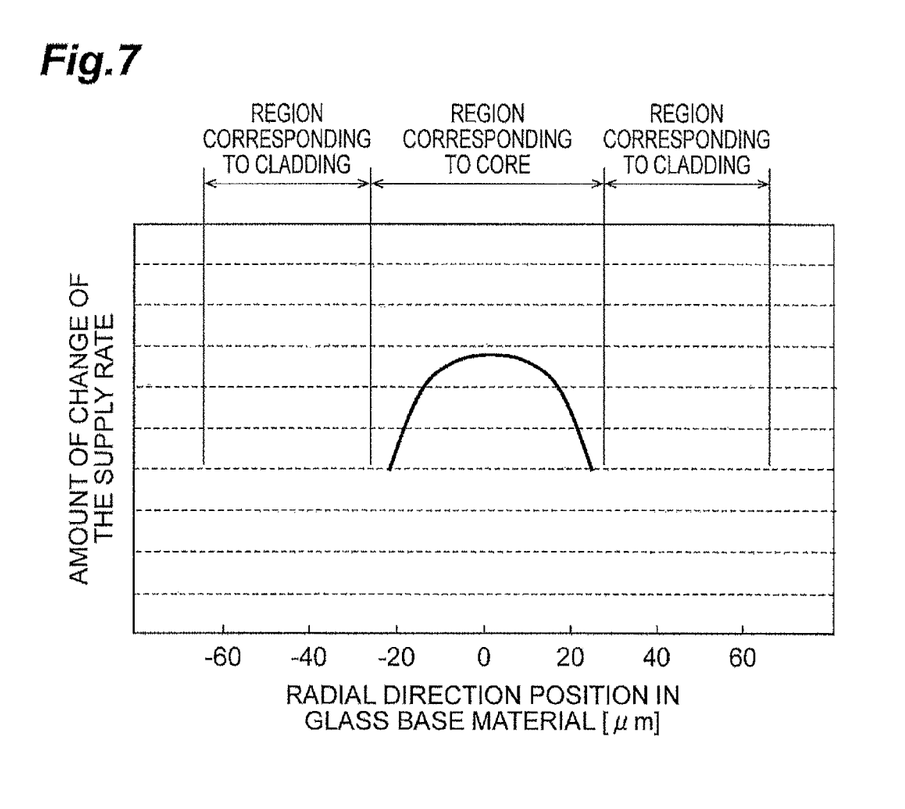
FIG. 7 is a graph illustrating an amount of change of a supply rate of an additive, acquired on the basis of FIG. 6.

FIG. 7 is a graph illustrating an amount of change of the supply rate of the additive, acquired on the basis of FIG. 6. In FIG. 7, the ordinate designates the amount of change of the supply rate, or a difference between the supply rate before readjustment and the supply rate after the readjustment, and the abscissa designates a radial direction position (unit: μm) with respect to the center axis as an original point. In the present embodiment, no additive is supplied to the region 30b corresponding to the cladding 12, and thus the amount of change of the supply rate is shown only in the region 30a corresponding to the core 10.

In this step S4, the supply rate preferably is readjusted so that the supply rate of the additive becomes zero or more at an outermost edge of an additive supply range of a second glass base material 30 formed in step S5 described later. For example, if calculating the amount of change of the supply rate from deviation of a refractive index caused by residual stress results in a negative amount of change at the outermost edge of the additive supply range, an absolute value of the amount of change may be added to the entire additive supply range. The additive supply range of the glass base material 30 means the region 30a corresponding to the core 10 in the present embodiment. If the refractive index distribution extends to a part of the cladding 12, the additive supply range may include a region corresponding to the part.

Subsequently, the second glass base material 30 with a cylindrical shape is formed while the additive at the supply rate after readjustment is supplied (step S5). In step S5, as with step S1 described above, at least the region 30a corresponding to the core 10 in the glass base material 30 is formed by using any one of the OVD method, the MCVD method, and the PCVD method, for example.

Subsequently, the glass base material 30 formed in step S5 described above is drawn by using the drawing apparatus 20 illustrated in FIG. 3 (step S6). Then, there is formed second multi-mode optical fiber 1A in which deviation of a refractive index is corrected. A residual stress distribution of the second multi-mode optical fiber 1A in the radial direction may be measured again as needed, and then it may be checked whether deviation of a refractive index from the desired refractive index distribution, acquired from the residual stress distribution, is a predetermined threshold value or less.

Effects that can be acquired by the method of manufacturing the multi-mode optical fiber 1A of the present embodiment described above will be described. According to the present inventors' knowledge, a level of residual stress in multi-mode optical fiber after drawing is in close association with a level of deviation of a refractive index. Thus, deviation of the refractive index distribution caused by residual stress can be reduced by measuring a residual stress distribution to readjust a supply rate of an additive for adjusting a refractive index in accordance with s measurement result thereof. Particularly in a case of multi-mode optical fiber, unlike single-mode optical fiber, deviation of a refractive index distribution in a radial direction from a proper a profile causes its bandwidth characteristics to deteriorate. Thus, it is desirable to most reduce deviation of the refractive index distribution from the proper a profile to acquire wide bandwidth characteristics. In the method of the present embodiment, as described above, deviation of the refractive index distribution from the proper a profile can be reduced by actually measuring residual stress distribution of multi-mode optical fiber in the radial direction to reflect a result of the measurement in a flow rate condition of an additive for adjusting a refractive index.

The method disclosed in Japanese Unexamined Patent Publication No. JP2006-290710A described above is suitable for dispersion compensation fiber and optical fiber for wavelength-division multiplex, and is based on a single-mode optical fiber. Thus, correction of deviation of a refractive index is only described to the extent of correction of a relative refractive index difference between a core and a cladding. In addition, residual stress is calculated from structure of a glass base material (preform). In a case of multi-mode optical fiber like the present embodiment, it is important for a wide bandwidth product to allow a refractive index distribution of the core 10 in the radial direction accurately to coincide with a desired refractive index distribution (such as the a profile), and thus the method disclosed in JP2006-290710A is insufficient. In addition, the method disclosed in Japanese Unexamined Patent Publication No. JP2014-534944A described above requires a plurality of glass base materials (preforms) to be drawn at different drawing tension, and thus there is a problem of reducing a yield of optical fiber. The method of manufacturing of the present embodiment enables these problems to be solved and deviation of a refractive index distribution of multi-mode optical fiber to be effectively reduced.

Like the present embodiment, a supply rate of an additive at an outermost edge of an additive supply range in the second glass base material 30 may be readjusted in step S4 so that the supply rate becomes zero or more. A level of the residual stress is not necessarily zero at the outermost edge of the additive supply range (typically the region 30a corresponding to the core 10). Thus, if the supply rate of the additive is set so that deviation of a refractive index converted from measured residual stress is canceled, the supply rate of the additive may have a negative value depending on a residual stress value. The refractive index decreases with distance from the center axis AX in the vicinity of the core 10 of the multi-mode optical fiber 1A (refer to FIG. 2), and thus this kind of phenomenon tends to easily occur particularly in the vicinity of the outermost edge of the additive supply range. Thus, the supply rate of the additive can be prevented from having a negative value to effectively reduce deviation of a refractive index distribution, caused by residual stress, by readjusting the supply rate so that the supply rate of the additive at the outermost edge of the additive supply range becomes zero or more.

It is more preferable that the supply rate of the additive is zero at the outermost edge of the supply range of the additive. That is, if the supply rate of the additive at the outermost edge of the supply range of the additive is more than zero, a flow rate condition of the additive discontinuously varies in a boundary portion between the supply range of the additive and an outside region of the additive supply range (typically, the region 30b corresponding to the cladding 12) where no additive is supplied. Thus, it is preferable that the flow rate condition of the additive continuously and gradually varies in the boundary between the additive supply range and the region outside the additive supply range.

Like the present embodiment, in steps S1 and S5, at least region 30a of the glass base material 30, corresponding to the core 10 of the multi-mode optical fiber 1A, may be formed by using any one of the OVD method, the MCVD method, and the PCVD method. As described above, in a case where the glass base material 30 is formed by using a method of radially accumulating silica glass, the effects described above can be achieved by particularly and preferably performing steps S3 and S4 of the present embodiment.

(Modification)

Figure 8:
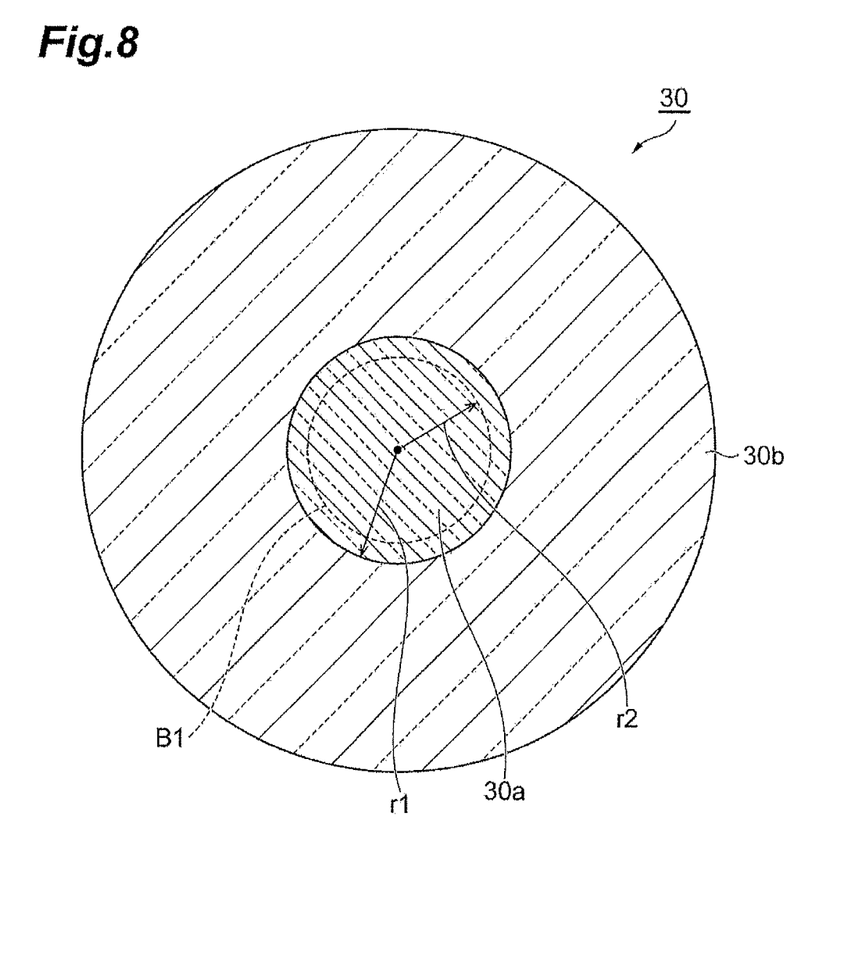
FIG. 8 illustrates a section perpendicular to a center axis of a glass base material.

Here, a modification of the embodiment above will be described. FIG. 8 illustrates a section perpendicular to a center axis of the glass base material 30, and illustrates a region B1 to be an object of readjusting a supply rate of an additive in the present modification. In step S4 of the embodiment above, the region 30a of the glass base material 30, corresponding to the core 10, is an object of readjusting a supply rate of an additive, and the object region B1 of the present modification is smaller than the region 30a. That is, in a case where a radius of the region 30a is indicated as "r1", a radius r2 of the region B1 where the supply rate of the additive is to be readjusted is less than the radius r1. For example, the radius r2 is 0.95 times the radius r1 or less.

According to the present inventors' knowledge, a level of residual stress in the vicinity of the outermost edge of a core 10 of the multi-mode optical fiber 1A greatly varies for each manufacturing lot, and thus residual stress is not constant. Thus, deviation of a refractive index distribution, caused by residual stress can be more accurately reduced by readjusting the supply rate only in a region corresponding to a core of the glass base material except a region corresponding to such a region where residual stress is inconstant.

In the present modification, a supply rate of an additive at an outermost edge of the region B1 of a readjustment object in the glass base material 30 may be readjusted so that the supply rate becomes zero or more. This enables the supply rate of the additive to be prevented from having a negative value, as with the embodiment above, and thus deviation of a refractive index distribution, caused by residual stress, can be effectively reduced. For example, if calculating the amount of change of the supply rate from deviation of a refractive index caused by residual stress results in a negative amount of change at the outermost edge of the region B1 of a readjustment object, an absolute value of the amount of change may be added to the entire region B1 of a readjustment object.

EXAMPLES

First Example

Subsequently, examples of the embodiment above will be described. In the present example, a region 30a corresponding to a core of the glass base material 30 was formed by using the OVD method, and a refractive index distribution of the region 30a was measured. Then, it was checked whether the refractive index distribution of the region 30a corresponding to a core was a targeted proper a profile. Subsequently, a region 30b corresponding to a cladding was formed on an outer periphery of the region 30a corresponding to a core by using the VAD method to acquire the glass base material 30. After that, the glass base material 30 was drawn. At that time, tension at a glass portion was 150 g. Measuring residual stress of drawn fiber resulted in acquiring the residual stress distribution illustrated in FIG. 5 described above. The residual stress was measured by a method using a photoelastic effect. Japanese Unexamined Patent Publication No. JP2003-315184A discloses an example of a specific method of measurement, for example.

Then, only a residual stress distribution of the core 10 was extracted from the measured residual stress distribution, and was converted to deviation of a refractive index from a desired refractive index distribution. The coefficient, "$-4.2 \times 10^{-12} Pa^{-1}$", was used for the conversion from the residual stress distribution to the refractive index distribution. Next, a $GeCl_4$ flow rate (supply rate) pattern corresponding to a refractive index distribution in a radial direction during soot deposition was readjusted to correct deviation of the refractive index distribution (refer to FIG. 6). Specifically, a graph of deviation of the refractive index distribution (refer to FIG. 6) was flipped upside down, and was added to an initial GeCl$_4$ flow rate pattern.

Even a part of a flow rate pattern after readjustment having a negative value when the GeCl$_4$ flow rate pattern was readjusted causes the readjustment to be substantially impossible, and thus correction of adding a predetermined value was simultaneously performed so that a minimum value of the flow rate pattern after the readjustment had a positive value.

The region 30b corresponding to a cladding was added to the region 30a corresponding to a core, formed as described above, to form the glass base material 30, and the glass base material 30 was drawn at tension 150 g. Measuring a bandwidth of the acquired multi-mode optical fiber acquired a result in which an OFL bandwidth at 850 nm was 3600 MHz·km, and an effective modal bandwidth (EMB) was 6500 MHz·km, and thus multi-mode optical fiber satisfying a bandwidth of an OM4 was acquired.

Second Example

In a second example, when residual stress was converted to a GeCl$_4$ flow rate pattern in the first example, the GeCl$_4$ flow rate pattern was readjusted by using only values of residual stress in a range from a center axis of the core 10 to a distance 0.95 times a radius of the core 10. At the time, a predetermined value was added to the GeCl$_4$ flow rate pattern so that the GeCl$_4$ flow rate became zero at an outermost edge of a region of a readjustment object (a range to a distance 0.95 times the radius of the core 10).

The region 30b corresponding to a cladding was added to the region 30a corresponding to a core, formed as described above, to form the glass base material 30, and the glass base material 30 was drawn at tension 150 g. Measuring a bandwidth of the acquired multi-mode optical fiber acquired a result in which an OFL bandwidth at 850 nm was 3800 MHz·km, and an EMB was 6800 MHz·km, and thus multi-mode optical fiber satisfying the bandwidth of the OM4 was acquired.

Comparative Example

In a comparative example, the glass base material 30 was formed without readjusting a GeCl$_4$ flow rate pattern by using residual stress in the first example, the glass base material 30 was drawn. Measuring a bandwidth of the acquired multi-mode optical fiber acquired a result in which an OFL bandwidth at 850 nm was 1500 MHz·km, and an EMB was 4500 MHz·km, and thus multi-mode optical fiber satisfying the bandwidth of the OM4 was not acquired.

The method of manufacturing multi-mode optical fiber in accordance with the present invention is not limited to the embodiments and the examples, described above, and thus various modifications are available. For example, while the embodiment above shows a case where a refractive index distribution of a cladding portion is flat, the cladding portion can have various refractive index distributions. For example, even if a refractive index distribution of a cladding portion includes so-called a trench (groove) portion, the effects of the present invention can be suitably achieved.

What is claimed is:

1. A method of manufacturing multi-mode optical fiber, the method comprising:
    forming a first glass base material with a cylindrical shape while controlling a supply rate of an additive for adjusting a refractive index to achieve a target refractive index distribution in a radial direction of multi-mode optical fiber;
    forming a first multi-mode optical fiber by drawing the first glass base material;
    measuring a residual stress distribution in a radial direction of the first multi-mode optical fiber after being drawn;
    readjusting the supply rate of the additive in accordance with deviation of a refractive index, acquired from the residual stress distribution measured, from the desired refractive index distribution;
    forming a second glass base material with a cylindrical shape while supplying the additive at the readjusted supply rate; and
    forming a second multi-mode optical fiber by drawing the second glass base material,
    wherein in readjusting the supply rate of the additive, in a case where a radius of a region of the first glass base material corresponding to a core of the first multi-mode optical fiber is indicated as "r1", a radius r2 of a region where the supply rate of the additive is to be readjusted is less than the radius r1,
    wherein the radius r2 is 0.95 times the radius r1 or less, and
    the amount of the readjusting the supply rate of the additive is zero outside of the radius r2.

2. The method of manufacturing multi-mode optical fiber according to claim 1, wherein in the readjusting the supply rate of the additive, the supply rate is readjusted so that the supply rate of the additive becomes more than zero at an outermost edge of an additive supply range in the second glass base material, the additive supply range is a radial directional area where the additive is supplied.

3. The method of manufacturing multi-mode optical fiber according to claim 1, wherein in the readjusting the supply rate of the additive, the supply rate is readjusted so that the supply rate of the additive becomes more than zero at an outermost edge of the region where the supply rate of the additive is to be readjusted.

4. The method of manufacturing multi-mode optical fiber according to claim 1, wherein in the forming the first glass base material and the forming the second glass base material, at least regions of the first and second glass base material corresponding to cores of first and second multi-mode optical fiber are formed by using an outside vapor deposition (OVD) method, a modified chemical vapor deposition (MCVD) method, or a plasma-activated chemical vapor deposition (PCVD) method.

* * * * *